United States Patent
Bump et al.

(10) Patent No.: US 9,865,156 B2
(45) Date of Patent: Jan. 9, 2018

(54) SYSTEM FOR CONTEXTUALIZING AND RESOLVING ALERTS

(71) Applicant: Invensys Systems, Inc., Foxboro, MA (US)

(72) Inventors: Scott S. Bump, Franklin, MA (US); Hugh S. Hanson, Mansfield, MA (US)

(73) Assignee: Schneider Electric Systems USA, Inc., Foxboro, MA (US)

(*) Notice: Subject to any disclaimer, the term of this patent is extended or adjusted under 35 U.S.C. 154(b) by 117 days.

(21) Appl. No.: 14/863,004

(22) Filed: Sep. 23, 2015

(65) Prior Publication Data
US 2017/0084167 A1    Mar. 23, 2017

(51) Int. Cl.
*A61B 3/00* (2006.01)
*G08B 29/02* (2006.01)

(52) U.S. Cl.
CPC .................. *G08B 29/02* (2013.01)

(58) Field of Classification Search
None
See application file for complete search history.

(56) References Cited

U.S. PATENT DOCUMENTS

| | | | |
|---|---|---|---|
| 5,931,878 A * | 8/1999 | Chapin, Jr. | G06Q 99/00 340/438 |
| 5,960,214 A * | 9/1999 | Sharpe, Jr. | G05B 19/0423 700/9 |
| 6,006,171 A * | 12/1999 | Vines | G05B 15/02 700/83 |
| 6,246,325 B1 * | 6/2001 | Chittipeddi | G06F 11/006 340/3.43 |
| 6,774,786 B1 * | 8/2004 | Havekost | G05B 23/0272 340/500 |
| 7,010,450 B2 * | 3/2006 | Law | G05B 9/02 702/108 |
| 7,113,085 B2 * | 9/2006 | Havekost | G05B 23/027 340/506 |
| 7,272,531 B2 * | 9/2007 | Kavaklioglu | G06F 11/008 700/108 |
| 7,562,135 B2 * | 7/2009 | Eryurek | G03F 7/0007 700/1 |
| 7,627,666 B1 * | 12/2009 | DeGiulio | G06Q 10/08 705/28 |
| 7,692,537 B2 * | 4/2010 | Skold | G05B 23/0272 340/500 |
| 8,554,714 B2 * | 10/2013 | Raymond | G06N 5/025 706/47 |
| 8,762,106 B2 * | 6/2014 | Miller | G05B 17/02 702/179 |
| 9,196,148 B1 * | 11/2015 | Hutz | G08B 21/18 |
| 2002/0163427 A1 * | 11/2002 | Eryurek | G05B 23/027 340/500 |

(Continued)

*Primary Examiner* — Quan-Zhen Wang
*Assistant Examiner* — Chico A Foxx
(74) *Attorney, Agent, or Firm* — Stephen Manetta; Ralph Graham

(57) ABSTRACT

Systems and methods for generating an alert resolution status based on a contextualized alert. An asset repository stores asset-specific data for interpreting an asset parameter. A diagnostic contextualization component is coupled to the asset repository and generates the contextualized alert by retrieving data in the repository. The component also generates the alert resolution status based on determinations related to the contextualized alert.

20 Claims, 8 Drawing Sheets

(56) References Cited

U.S. PATENT DOCUMENTS

| | | | |
|---|---|---|---|
| 2005/0007249 A1* | 1/2005 | Eryurek | G05B 23/027 340/511 |
| 2005/0182650 A1* | 8/2005 | Maddox, Jr. | G06Q 10/06 705/305 |
| 2005/0197803 A1* | 9/2005 | Eryurek | G05B 23/0289 702/185 |
| 2005/0283392 A1* | 12/2005 | Garrow | G06Q 10/06312 705/7.22 |
| 2006/0022819 A1* | 2/2006 | Vincent Granny | G08B 3/1033 340/539.17 |
| 2006/0047379 A1* | 3/2006 | Schullian | B61L 27/0077 701/19 |
| 2006/0143034 A1* | 6/2006 | Rothermel | G06Q 10/10 705/301 |
| 2007/0300228 A1* | 12/2007 | White, III | H04L 41/0681 718/102 |
| 2008/0125887 A1* | 5/2008 | Case | G05B 23/0272 700/83 |
| 2008/0278357 A1* | 11/2008 | Urie | H03M 1/1076 341/102 |
| 2009/0210376 A1* | 8/2009 | Lorge | G06N 5/04 706/47 |
| 2009/0271348 A1* | 10/2009 | Allen | G06F 17/3051 706/47 |
| 2009/0327429 A1* | 12/2009 | Hughes | G06Q 10/107 709/206 |
| 2010/0073160 A1* | 3/2010 | Gilmour | G06F 3/04817 340/540 |
| 2011/0010654 A1* | 1/2011 | Raymond | G06N 5/025 715/772 |
| 2011/0052423 A1* | 3/2011 | Gambier | F04B 49/065 417/63 |
| 2011/0202495 A1* | 8/2011 | Gawlick | A61B 5/0002 706/59 |
| 2012/0005107 A1* | 1/2012 | Lowden | G06Q 10/06 705/305 |
| 2012/0323531 A1* | 12/2012 | Pascu | G01M 13/028 702/184 |
| 2013/0113616 A1* | 5/2013 | Pinel | G06Q 10/0631 340/501 |
| 2013/0196613 A1* | 8/2013 | Graff-Radford | H04W 4/22 455/404.2 |
| 2014/0222522 A1* | 8/2014 | Chait | G06Q 10/0637 705/7.36 |
| 2014/0266713 A1* | 9/2014 | Sehgal | G08B 23/00 340/540 |
| 2014/0266755 A1* | 9/2014 | Arensmeier | F24F 11/0086 340/679 |
| 2015/0302666 A1* | 10/2015 | Das | G07C 5/006 701/34.3 |
| 2016/0330219 A1* | 11/2016 | Hasan | H04L 63/1416 |
| 2017/0113883 A1* | 4/2017 | Bondeson | B65G 53/66 |

* cited by examiner

SYSTEM FOR CONTEXTUALIZING AND RESOLVING ALERTS

BACKGROUND

Maintenance operations related to system assets are assisted through the use of maintenance software applications. The applications typically monitor asset health for a broad range of system assets, such as assets used in process control, assets that implement home or commercial security, assets related to commercial vehicles, or assets that provide access control based on security privileges of various personnel. The applications typically function in coordination with various platforms, such as industrial process control platforms used to implement a control strategy on field devices or other production line components. Maintenance applications of this type typically enable personnel tasked with asset management, such as maintenance supervisors, to view asset-related information and to determine as well as execute a maintenance plan based on the viewed information.

Many parts of the system being monitored by the application, such as intelligent devices like transmitters and valve positioners in the case of an industrial process control system, are capable of detecting irregular or noteworthy conditions and reporting these conditions to the platform. Unfortunately, current maintenance software applications cannot address these asset-specific conditions (reported to the maintenance software as alarms, or alerts) efficiently while still adhering to a general maintenance plan applicable to every asset in the platform in a manner that optimizes output and minimizes disruptions due to the need to repair or replace assets, such as production line assets. Additionally, current maintenance software applications are not capable of generating asset-related data in a manner that allows for these detected conditions to be presented as a consolidated, prioritized list of contextualized alerts that communicate actionable descriptions to maintenance personnel.

SUMMARY

Aspects of the present invention permit an asset maintenance plan implemented using a maintenance software application to efficiently address asset-specific conditions reported as alarms or alerts by intelligent devices. Moreover, aspects of the invention do so while adhering to a general maintenance plan applicable to every asset in the platform in a manner that optimizes output and minimizes disruptions due to the need to repair or replace assets. By permitting a maintenance software application to generate asset-related data in a manner that allows for these detected conditions to be presented as a consolidated, prioritized list of contextualized alerts, aspects of the invention improve how actionable descriptions are communicated to maintenance personnel.

In an aspect, a computer implemented system is configured to generate a contextualized alert related to an alert resolution process, comprising an asset repository and a diagnostic contextualization component. The asset repository stores asset-specific data for interpreting an asset parameter descriptive of the condition of an asset. The asset-specific data comprises alert response data, asset identification data and alert prioritization data. The diagnostic contextualization component is coupled to the asset repository and is configured for generating an alert resolution status by performing the steps of: retrieving asset identification data from the asset repository to identify a received alert; retrieving alert prioritization data from the asset repository based on the retrieved asset identification data; generating a contextualized alert based on the retrieved asset identification data and the retrieved alert prioritization data; determining whether an actionable output related to the contextualized alert has been received; and generating an alert resolution status based on the determination.

In another aspect, a tangible processor-readable memory stores processor-executable instructions for generating an alert resolution status related to a contextualized alert.

In yet another aspect, a computerized method for generating an alert resolution status related to a contextualized alert is provided.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
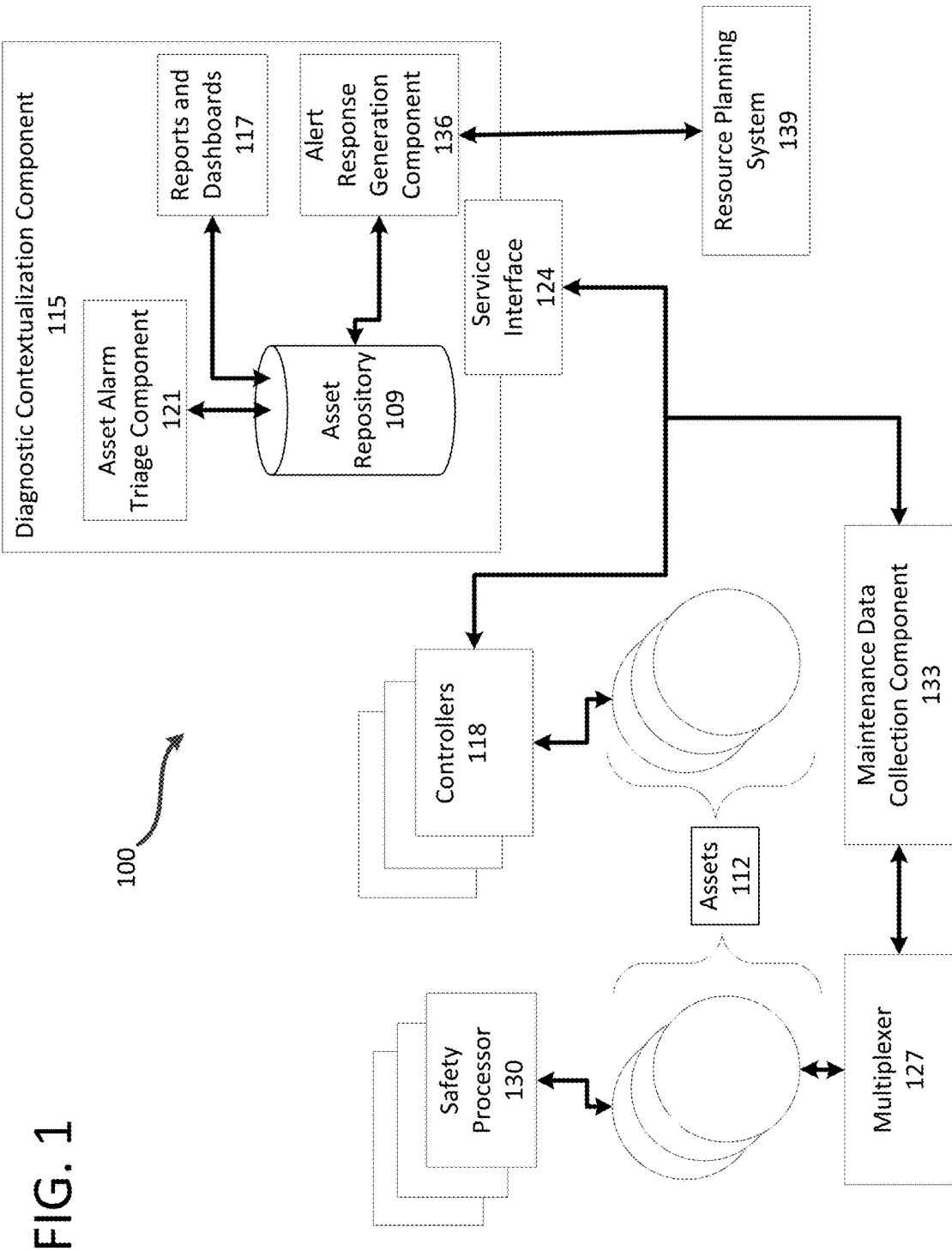
FIG. 1 depicts a system configured to generate a contextualized alert related to an alert resolution process in an asset monitoring system according to an embodiment of the present invention.

FIG. 1 depicts one example of an asset maintenance system configured to receive updates related to assets that comprise the system. In an embodiment, the asset maintenance system comprises an industrial process control system 100 configured to provide supervisory level and/or regulatory level control of an industrial process. In the course of executing process control, the system 100 monitors, logs, and displays relevant manufacturing/production events and associated data. In addition, the system 100 is configured to generate a contextualized alert related to an alert resolution process according to an embodiment of the present invention. The system 100 comprises an asset repository 109 (e.g., a persistent store, such as a database) storing asset-specific data for interpreting an asset parameter descriptive of the condition of an asset 112. In an embodiment, the asset 112 is a field device, such as a valve positioner or a transmitter, under the control of the process control system 100. Additionally or alternatively, other examples of asset maintenance systems include various process control systems, such as control systems used to automate the power electronics and associated components used in elevator control systems. Additional examples of asset maintenance systems further comprise: assets used in the implementation of security alarm systems, assets used in the monitoring of vehicle fleets such as commercial vehicle fleets, and assets used to restrict and/or monitor access based on personnel category (e.g. employee, visitor, general public, etc.) and/or other factors, through the use of assets such as access badges, identification cards, or the like.

Aspects of this invention relate to a system for generating a contextualized alert using a diagnostic contextualization component by accessing a data store in order to retrieve relevant asset-related data based on an asset parameter received from an asset, such as an intelligent field device. In an embodiment, the asset parameter comprises a diagnostic bit set. Additionally or alternatively, the asset parameter comprises a parameter provided by an asset, such as a parameter descriptive of current amplitude applied to a valve positioner, and/or various forms of data provided by assets used in the asset maintenance systems described above. In another embodiment, the asset parameter is collected from the asset by a diagnostic contextualization component 115. In yet another embodiment, the asset parameter is based upon various forms of observational data related to an asset such as video, or based upon data descriptive of the video such as text-based data files.

The diagnostic contextualization component 115 is configured to retrieve sufficient relevant data based on the bit set to provide an actionable description related to asset maintenance. The diagnostic contextualization component 115 is further configured to generate a contextualized alert based on the retrieved data after retrieving the relevant data. The contextualized alert includes asset-related data such as alert (i.e., "condition") details, system context, asset-specific documentation data, and historical information about previous maintenance. The diagnostic contextualization component 115 also generates an alert resolution status in part based on determining whether data related to an actionable output (i.e., planned asset maintenance) exists for the asset 112. The alert resolution status comprises data that allows for the contextualized alert to be presented as a prioritized list, such as a list displayed to a maintenance supervisor as part of a dashboard, for example.

The diagnostic contextualization component 115 accesses the alert resolution status to present the contextualized alerts as a prioritized list in a manner that gives the necessary information to resolve an irregular or noteworthy condition, allowing for the system 100 to effectively implement a course of action that resolves the condition described by the contextualized alert in a more efficient manner compared to conventional asset maintenance applications. By accessing the alert resolution status in the manner described herein, the diagnostic contextualization component 115 is capable of generating asset-related data in a manner that allows for detected conditions to be presented as a consolidated, prioritized list of contextualized alerts, improving how actionable descriptions are organized and communicated. The data generated by the diagnostic contextualization component 115 allows for various displays to be generated, such as a dashboard display comprising various summarized displays, or a detailed display depicting extensive asset-related details and including a user selectable request generator that results in rendering actionable output to address asset maintenance issues. By generating and utilizing asset-related data such as contextualized alerts in a manner that increases the amount of information available to personnel such as maintenance supervisors, aspects of the invention provide for addressing asset-specific conditions with increased efficiency, resulting in minimized disruptions and optimized production line output.

In an embodiment, the asset 112 comprises an intelligent field device capable of detecting irregular or noteworthy asset-related details that are of particular interest to maintenance personnel tasked with using maintenance tools to maintain aspects of control system 100. In another embodiment, the noteworthy asset-related details are of interest to maintenance personnel, in contrast to plant operation personnel who are tasked with operating the control system 100. In an embodiment, the component 115 is implemented in combination with process control system 100 used on a production line.

Still referring to FIG. 1, the asset-specific data stored in the asset repository 109 further comprises asset identification data and alert prioritization data, each of which will be further described herein. In an embodiment, the asset repository 109 comprises an asset information directory, an alert historian, and an alert profile historian. In an embodiment, the diagnostic contextualization component 115 is coupled to the asset repository 109 and is configured for generating alert resolution status data. In another embodiment, the asset repository 109 interfaces with the diagnostic contextualization component 115 and receives updates related to alert contextualization and alert profile management, as will be further described herein. In an embodiment, the diagnostic contextualization component 115 is configured to detect asset-related details related to maintaining an asset in an optimal state of performance, and is configured for distributing asset-related details to the appropriate maintenance staff and providing various data including asset-related details, system context, and historical information about previous maintenance. In another embodiment, the asset-related details detected by the diagnostic contextualization component 115 allow for asset parameters provided by various assets to result in the generation of an alert related to an asset, as well as the generation of a contextualized alert related to an asset.

The diagnostic contextualization component 115 is configured for generating an alert resolution status by performing steps comprising: retrieving asset identification data from the asset repository 109 to identify a received alert; retrieving alert prioritization data from the asset repository 109 related to the received alert; generating a contextualized alert based on the retrieved asset identification data and the retrieved alert prioritization data; determining whether actionable output related to the contextualized alert has been received; and generating an alert resolution status based on the determination. In an embodiment, the alert prioritization data retrieved from the asset repository 109 is in part based upon the retrieved asset identification data.

The alert resolution status comprises data descriptive of a status determination that is based on the contextualized alert and is also based upon the actionable output determination. The alert resolution status comprises data that allows for the manipulation of information related to the alert, such as providing a prioritized list of asset-related details ordered by severity, as will be further described herein. In an embodiment, the prioritized list of asset-related details comprises contextualized alerts. And in an embodiment, an asset alarm triage component 121 that functions as part of the diagnostic contextualization component 115 determines the alert resolution status. The diagnostic contextualization component 115 displays information related to alerts as, for example, asset-related details ordered by severity for use with reports and dashboards 117. In an embodiment, the reports and dashboards 117 are presented on a user interface. Additionally or alternatively, the reports and dashboards 117 are presented as part of a web application.

Still referring to FIG. 1, one or more assets 112 are configured to communicate alerts to the diagnostic contextualization component 115 by passing an asset parameter, such as a diagnostic bit set, to the diagnostic contextualization component 115. In an embodiment, the asset 112 generating the alert communicates with a controller 118 to pass the asset parameter to the diagnostic contextualization component 115 via a service interface 124 associated with diagnostic contextualization component 115. The service interface 124 is programmed to provide, for example, configuration-free alert monitoring by providing received alerts as event-based data to the diagnostic contextualization component 115. In an embodiment, the service interface 124 comprises at least one interface standard used to enable inter-process and/or inter-system communication, such as the component object model (COM), the Common Object Request Broker Architecture (CORBA), Java Messaging Service (JMS), and the like. The controller 118 of FIG. 1 comprises a communications controller connected to assets 112 at a control node. In another embodiment, the controller 118 is configured to be connected to one or more communications modules and is configured to interface between the communications modules, the assets 112, and the diagnostic contextualization component 115.

With further reference to FIG. 1, in the illustrated embodiment, the asset 112 generating the alert is configured to communicate the alert to the diagnostic contextualization component 115 by passing an asset parameter to the diagnostic contextualization component 115 via a multiplexer 127. The asset 112 as shown in FIG. 1 also communicates with a safety processor 130. In an embodiment, the safety processor 130 comprises processors configured to independently process inputs from one or more assets 112 and the processors "vote" on the data in part to provide a safety barrier between the data provided by the assets 112 and an application configured to monitor the assets 112. The multiplexer 127 communicates with a maintenance data collection component 133 in the illustrated embodiment to pass the asset parameter from the communicating asset 112 to the diagnostic contextualization component 115. In another embodiment, a service interface 124 associated with the diagnostic contextualization component 115 receives asset parameters from the multiplexer 127. In yet another embodiment, maintenance data collection component 133 communicates with the multiplexer 127 and the service interface 124 of the diagnostic contextualization component 115 to facilitate the transmission of asset parameters from assets 112 to the diagnostic contextualization component 115.

Still referring to FIG. 1, in an embodiment, asset-specific data provided by the asset repository 109 further comprises alert response data. In an embodiment, alert response data further comprises descriptive data that provides context related to the state of the asset parameter, as will be further described herein. In another embodiment, the alert response data further comprises: other alerts reported by the particular asset 112; installation history for asset 112; location details related to asset 112; and maintenance work planned for asset 112. The diagnostic contextualization component 115 is configured to generate an alert resolution status based upon comparing the alert response data to the alert resolution status to render actionable output, as will be further described herein. This actionable output comprises, for example, data describing work planned for asset 112.

The diagnostic contextualization component 115 of FIG. 1 provides updated data in the form of an alert resolution profile to a resource planning system 139 configured to interpret and integrate real time data for use with process execution application tools. In an embodiment, the diagnostic contextualization component 115 is further programmed to perform the steps of: providing a result related to the actionable output to an alert resolution profile to update the alert resolution profile; and, determining the alert resolution status based on the updated alert resolution profile. In another embodiment, the diagnostic contextualization component 115 further comprises an alert response generation component 136 configured to provide a result related to the actionable output to an alert resolution profile to update the alert resolution profile; and to determine the alert resolution status based on the updated alert resolution profile.

Figure 2:
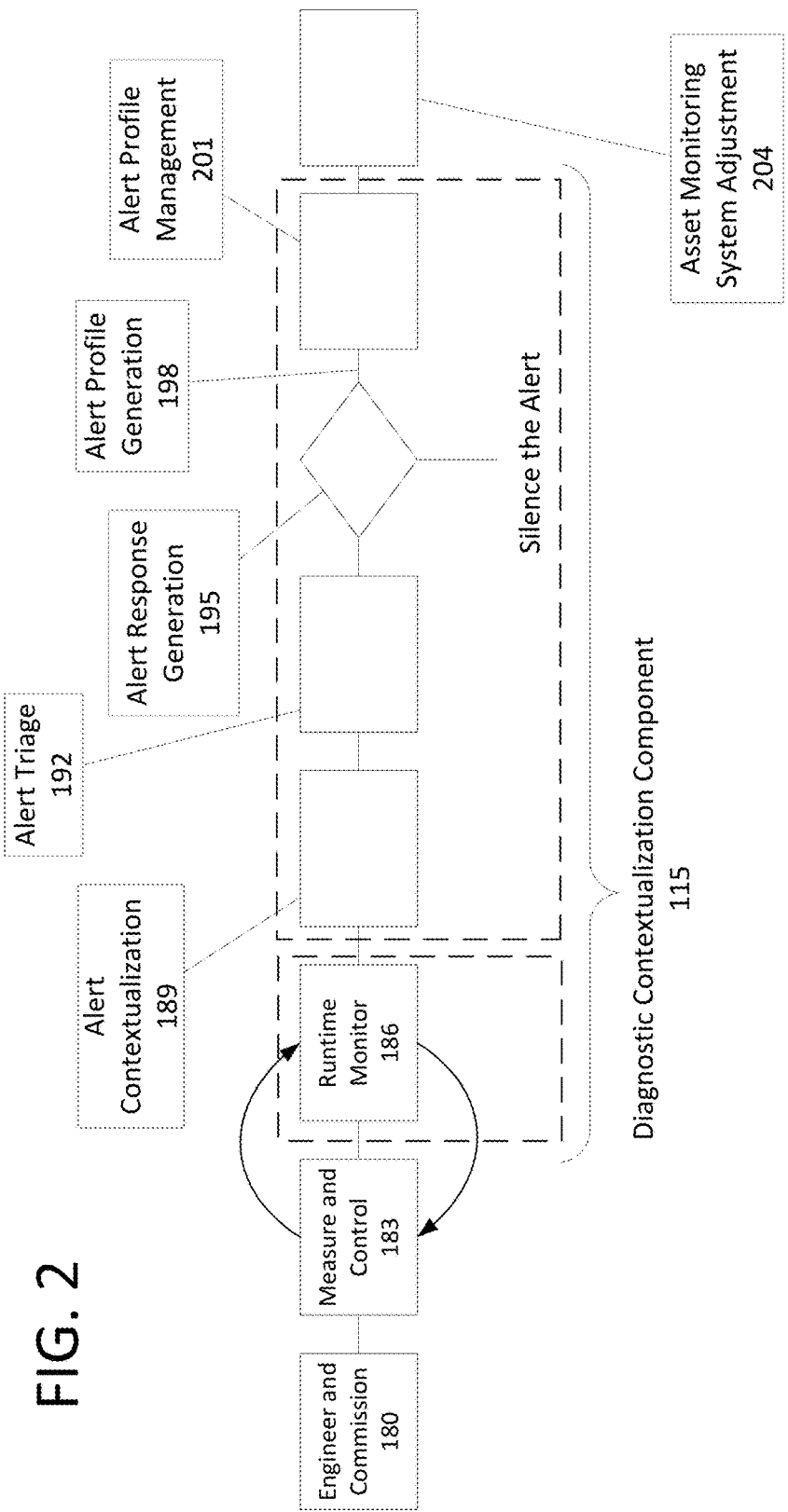
FIG. 2 depicts functional relations between and tasks completed by various software components comprising the contextualized alert generation system depicted in FIG. 1 according to an embodiment of the present invention.

FIG. 2 depicts functional relations between and tasks completed by various software components comprising the contextualized alert generation system depicted in FIG. 1, according to one embodiment of the present invention. In an embodiment, the functional relations depicted in FIG. 2 allow for various components to complete tasks that result in the installation, control, and monitoring of assets in a manner that increases the effectiveness of the asset monitoring system, resulting in improved results such as increased process control system efficiency. In an embodiment, monitoring the maintenance status of assets includes providing the contextualized alert generation system described herein. Tasks related to engineering and commissioning an asset maintenance system configured to monitor an asset, such as engineering and commissioning component 180 configured to monitor and control asset 112 as part of an asset monitoring system strategy are conventionally completed using an asset manager, such as field device manager software or the like. In an embodiment, tasks related to an asset monitoring system adjustment component 204, in part based on results generated based on an alert profile management component 201, are also typically completed using field device manager software. According to aspects of the invention, installation of an asset, such as asset 112, requires action by the engineering and commissioning component 180. A measure and control component 183 is configured to complete tasks that result in implementation of a control system strategy, as well as to adjust the control system in part based on asset parameters that are measured by the control system during implementation of the control system strategy. Tasks related to the measurement and control of an asset such as asset 112 are completed using distributed control system and safety software, in one embodiment.

As previously described in connection with FIG. 1, the diagnostic contextualization component 115 is configured for generating an alert resolution status. In an embodiment, runtime monitor 186 component executes tasks that allow for an asset parameter transmitted from the asset 112 to be monitored in real time. In an embodiment, runtime monitor 186 interacts with a measure and control component 183 to execute tasks allowing for data related to measure and control applications as well as runtime monitoring applications to be updated in real time. The diagnostic contextualization component 115 is further configured to provide functionality of a runtime monitor 186.

Diagnostic contextualization component 115 is also configured to complete additional tasks related to several aspects of the maintenance of asset 112. In an embodiment, the diagnostic contextualization component 115 includes an alert contextualization component 189 that performs contextualization tasks that provide context to asset parameters. The alert contextualization component 189 generates data used to uniquely present the full context needed to generate an action related to a contextualized alert. In another embodiment, a service interface 124 connected to the diagnostic contextualization component 115 as previously described completes the tasks of alert contextualization component 189 and runtime monitor 186.

Referring further to FIG. 2, an alert triage component 192 of diagnostic contextualization component 115 completes triage tasks. For instance, the alert triage component 192 provides contextualized alerts as a prioritized list, resulting in the generation of a list of asset-related details ordered by severity. In an embodiment, alert triage component 192 completes asset alarm triage component 121 tasks, such as determining the alert resolution status as described above. In another embodiment, the diagnostic contextualization component 115 accomplishes alert response generation tasks as indicated at reference character 195 based upon results related to tasks performed by the alert triage component 192. Diagnostic contextualization component 115 also generates data related to an alert profile at reference character 198. Tasks performed during alert response generation 195 include determining whether an actionable output related to the contextualized alert has been received, which includes, for example, rendering data descriptive of the asset parameter that is specific to the alert resolution profile, such as data used to generate an active alert resolution profile. In an embodiment, the alert response generation tasks 195 comprise silencing the alert as well as alert profile generation 198.

The alert profile management component 201 of diagnostic contextualization component 115 is additionally configured to complete tasks related to the generated alert profile 198 provided based on the generated alert response 195.

In an embodiment, the asset monitoring system adjustment component 204 is configured for adding to the knowledge base related to the asset 112, adjusting asset parameters that determine an operating state of the asset 112, implementing repair functions pertaining to the asset 112, and implementing replacement functions related to the asset 112.

Figure 3:
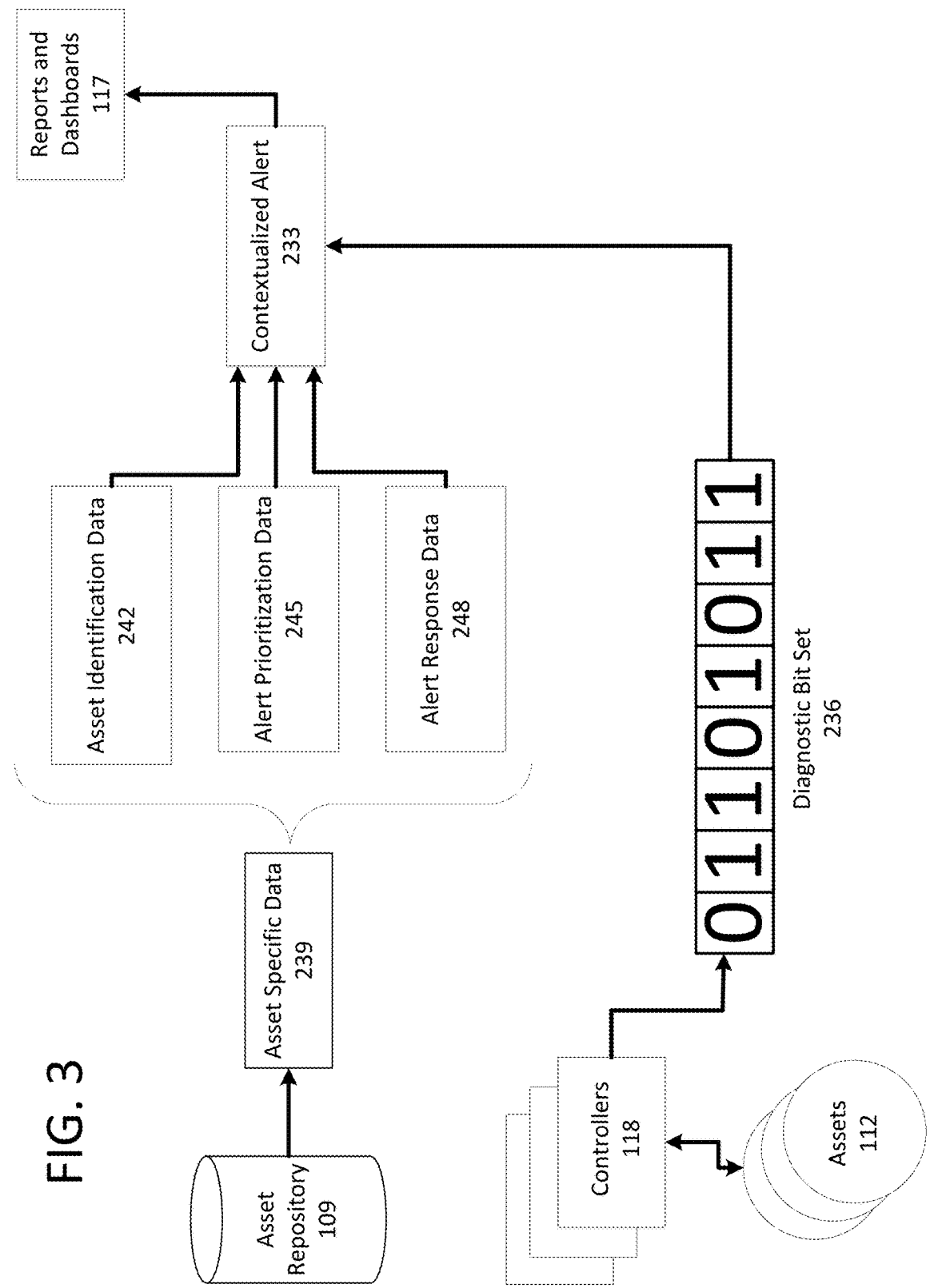
FIG. 3 depicts the generation of a contextualized alert according to an embodiment of the present invention.

FIG. 3 depicts the generation of a contextualized alert, according to an embodiment of the present invention. A contextualized alert 233 is generated based in part upon an asset parameter provided from asset 112 as previously described. The controller 118 provides the asset parameter, which comprises a diagnostic bit set 236 in the illustrated embodiment. The contextualized alert 233 comprises, for example, data generated for display using the reports and dashboards 117. The contextualized alert 233 comprises asset-specific data 239 obtained from the asset repository 109. In an embodiment, the asset-specific data 239 further comprises asset identification data 242, alert prioritization data 245, and alert response data 248.

In an embodiment, the asset identification data 242 provides for the meaning of diagnostic bit set 236 to be interpreted, for example, where two identical diagnostic bit sets 236 received by the diagnostic contextualization component 115 via two different assets 112 have different meanings based upon the particular asset 112 sending the diagnostic bit set 236. The diagnostic contextualization component 115 is configured to interpret the diagnostic bit set 236 based in part upon the asset 112 transmitting the diagnostic bit set 236 using asset identification data 242 retrieved from the asset repository 109. The diagnostic contextualization component 115 interprets the diagnostic bit set 236 to generate a contextualized alert 233 in part based upon the asset identification data 242. In an embodiment, asset identification 242 comprises asset-specific documentation data useful in interpreting the diagnostic bit set 236.

Additionally or alternatively, alert prioritization data 245 is used by the diagnostic contextualization component 115 to interpret the diagnostic bit set 236 and to generate the contextualized alert 233. Alert prioritization data 245 provides data related to the maintenance history of asset 112 as well as data related to the installation history of asset 112. The diagnostic contextualization component 115 is configured to interpret the diagnostic bit set 236 using the alert prioritization data 245 to generate contextualized alert 233 in part based upon the alert prioritization data 245. The diagnostic contextualization component 115 is further configured to accomplish the tasks of alert contextualization component 189 and alert triage component 192 based on the retrieved alert prioritization data 245 and the retrieved asset identification data 242. In another embodiment, diagnostic contextualization component 115 retrieves alert prioritization data 245 from the asset repository 109 based on retrieved asset identification data 242.

The diagnostic contextualization component 115 is further configured to determine whether actionable output related to the contextualized alert 233 has been received. The diagnostic contextualization component 115 is additionally configured to generate an alert resolution status based on the determination. In an embodiment, actionable output comprises data related to whether maintenance work has been planned for an asset. In another embodiment, the alert resolution status comprises data that allows for the manipulation of information related to the contextualized alert 233 by the diagnostic contextualization component 115. The alert resolution status comprises data that allows for alert response generation tasks 195 to be accomplished. In an embodiment, the alert resolution status comprises data that allows for contextualized alerts 233 to be displayed as a prioritized list of asset-related details ordered by severity.

Figure 4:
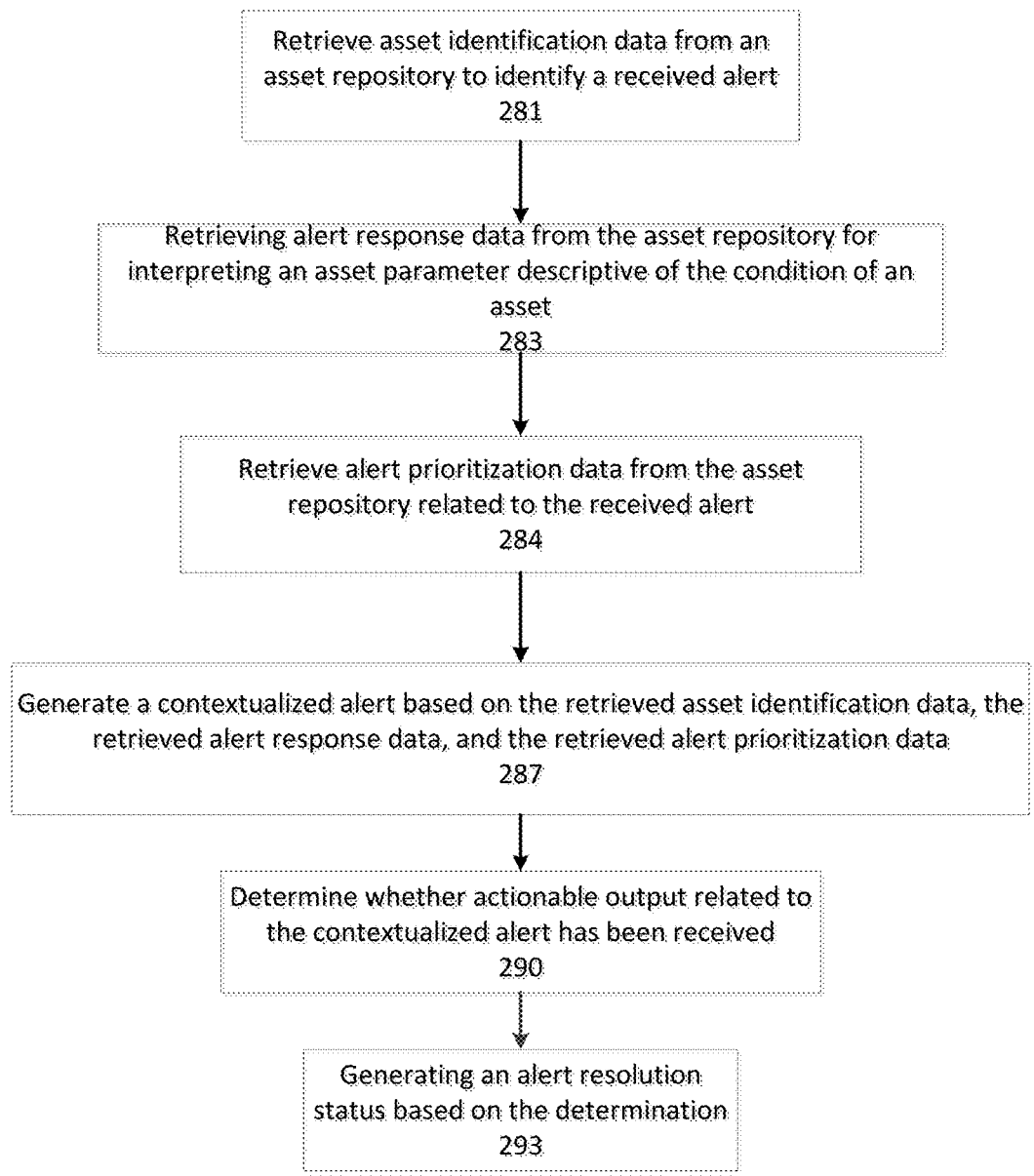
FIG. 4 depicts a computerized method for generating an alert resolution status related to a contextualized alert according to an embodiment of the present invention.

FIG. 4 is an exemplary flow chart depicting a computerized method for generating an alert resolution status related to a contextualized alert, according to one embodiment of the present invention. The process depicted by FIG. 4 begins at 281, where asset identification data 242 from an asset repository 109 is retrieved to identify a received alert. Step 283 comprises retrieving alert response data from the asset repository for interpreting an asset parameter descriptive of the condition of an asset.

At 284, alert prioritization data 245 is retrieved from the asset repository 109 that is related to the received alert. In an embodiment, the alert prioritization data 245 retrieved from the asset repository 109 is retrieved in part based upon the retrieved asset identification data 242. Step 287 comprises generating a contextualized alert 233 based on the retrieved asset identification data 242, the retrieved alert response data, and the retrieved alert prioritization data 245. At step 290, it is determined whether actionable output related to the contextualized alert 233 has been received. Finally, the process ends at step 293 by generating an alert resolution status based on the determination.

Figure 5:
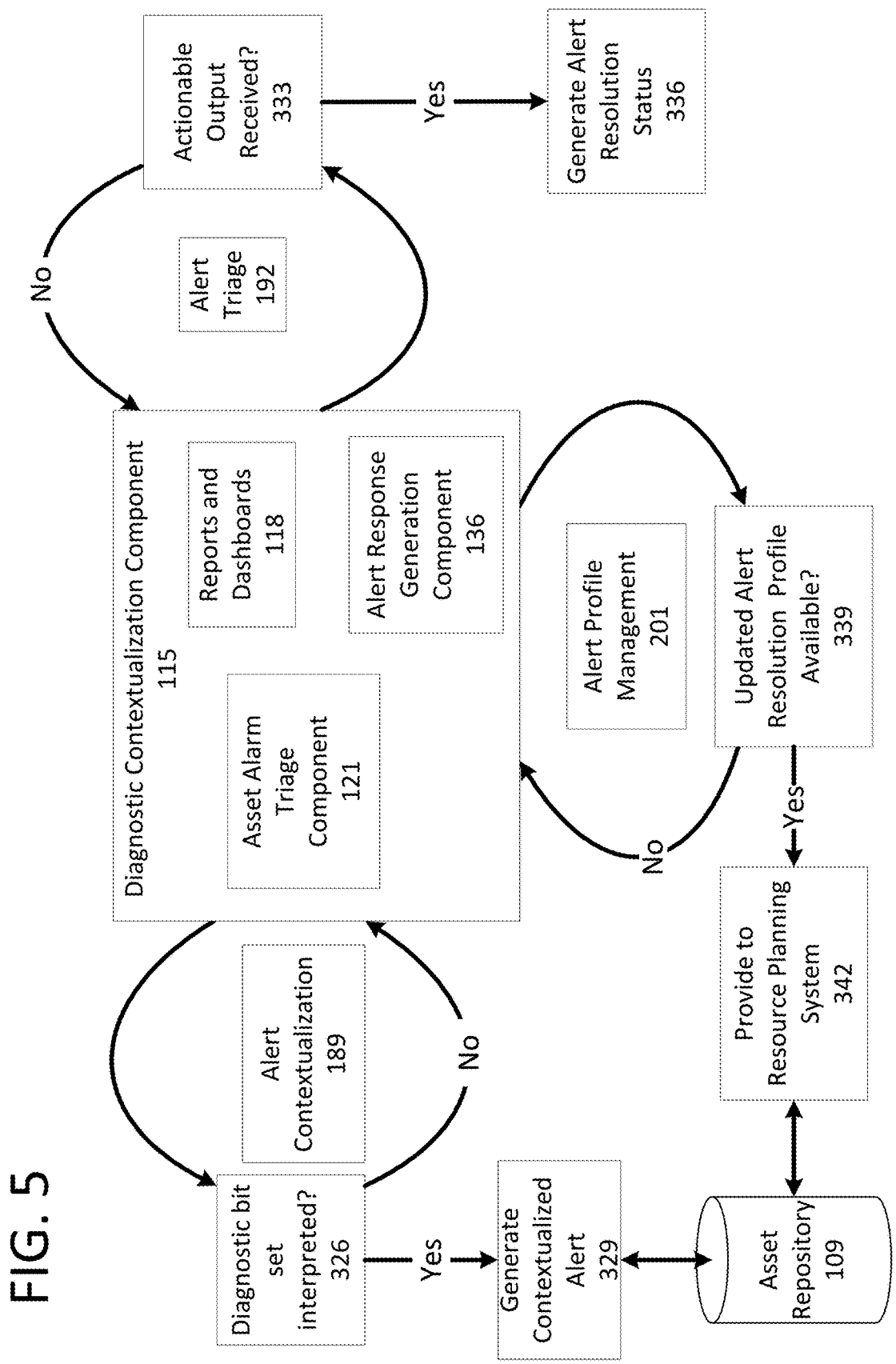
FIG. 5 depicts generating updated determinations related to alert contextualization alert triage and alert profile management according to an embodiment of the present invention.

FIG. 5 depicts generating updated determinations related to alert contextualization and alert triage, according to one embodiment of the present invention. In an embodiment, the diagnostic contextualization component 115 is configured to interact with various software components, such as alert contextualization component 189, alert triage component 192, and alert profile management component 201, to generate updated determinations related to alert contextualization, alert triage, and alert profile management, respectively. In an embodiment, the diagnostic contextualization component 115 is coupled to the asset repository 109 and is configured for generating alert resolution status data as previously described with respect to FIG. 1. In another embodiment, the asset repository 109 interfaces with the diagnostic contextualization component 115 and receives updates related to alert contextualization 189 and alert profile management 201. The updates received by the asset repository 109 related to alert contextualization 189 further comprise data related to the generation of the contextualized alert 329. The updates received by the asset repository 109 related to alert profile management 201 further comprise data related to providing data to the resource planning system 342, comprising an updated alert resolution profile.

With further reference to FIG. 5, the diagnostic contextualization component 115 is configured to determine whether diagnostic bit set 236 has been interpreted at 326 by alert contextualization component 189. If the diagnostic bit set 236 has been interpreted, the diagnostic contextualization component 115 proceeds to generate a contextualized alert 329, as previously described. If the diagnostic bit set 236 has not yet been interpreted, the diagnostic contextualization component 115 is configured to continue to access the asset repository 109 comprising asset-specific data 239 in order to retrieve asset identification data 242 and alert prioritization data 245 to continue alert contextualization until the diagnostic bit set 236 has been interpreted. In an embodiment, the asset repository 109 additionally comprises alert response data 248, and the diagnostic contextualization component 115 is further configured to retrieve the alert response data 248 until the diagnostic bit set 236 has been interpreted.

In another embodiment, the diagnostic contextualization component 115 is further configured to determine whether an actionable output has been received at step 333 by alert triage component 192. If an actionable output has been received, the diagnostic contextualization component 115 is further configured to generate an alert resolution status at step 336. The alert resolution status comprises data that allows for information related to the alert to be interpreted by the diagnostic contextualization component 115, for alert response generation tasks 195 to be accomplished, and for contextualized alerts 233 to be displayed as a prioritized list of asset-related details ordered by severity, as previously described. If actionable output has not yet been received, the diagnostic contextualization component 115 is configured to continue alert triage by component 192 until it is determined that an actionable output has been received.

Still referring to FIG. 5, in yet another embodiment, the diagnostic contextualization component 115 is further configured for alert profile management as performed by component 201, which includes determining whether an updated alert resolution profile is available at step 339. If an updated alert resolution profile is available, the updated alert resolution profile is provided to a resource planning system 139 at step 342. If an updated alert resolution profile is not available, the diagnostic contextualization component 115 is configured to continue alert profile management component 201 until it is determined that an updated alert resolution profile is available.

Figure 6:
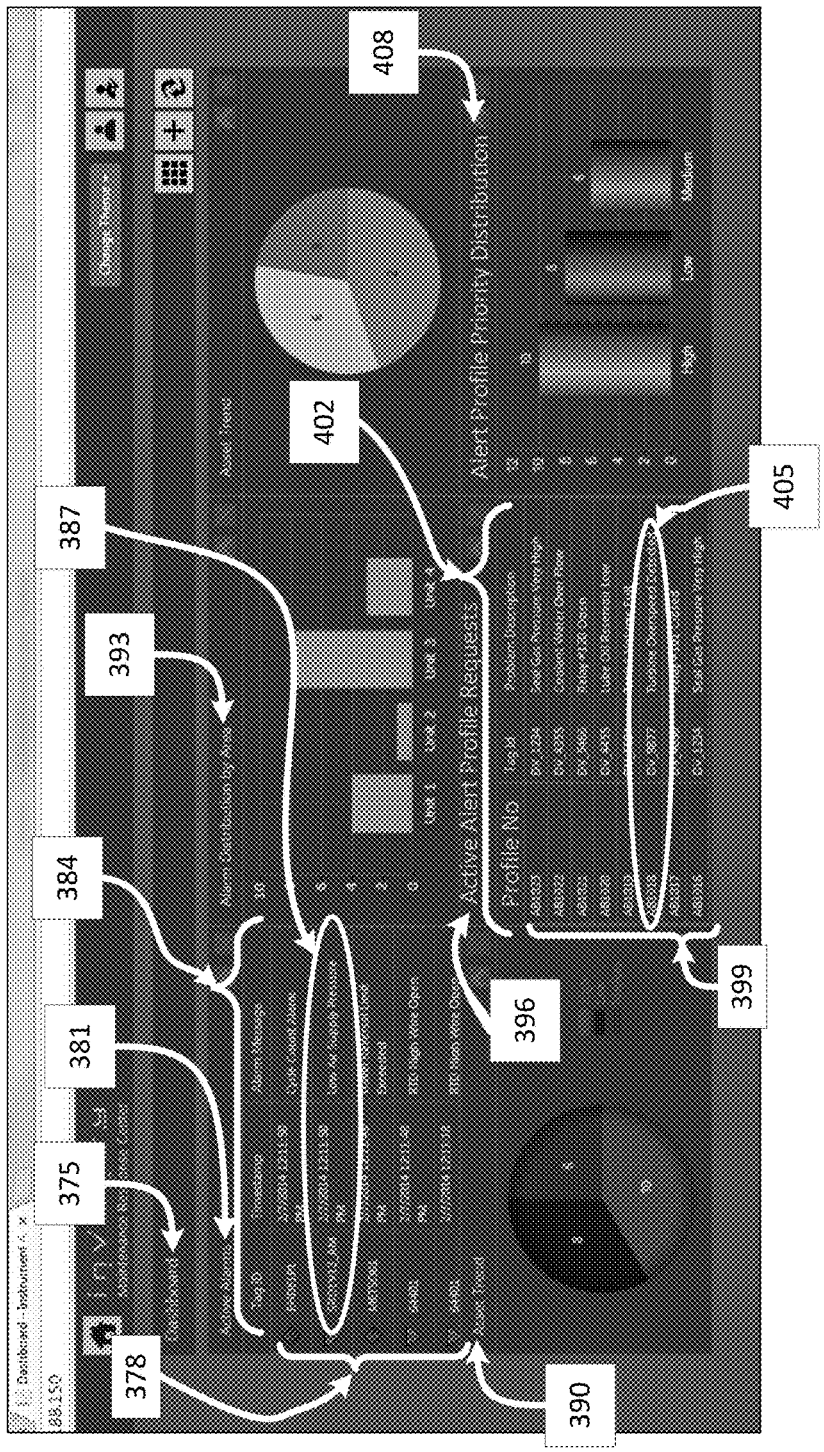
FIG. 6 is an exemplary screen shot depicting various contextualized alert data displayed as summarized alerts on a dashboard according to an embodiment of the present invention.

FIG. 6 is an exemplary screen shot depicting a user interface for displaying various contextualized alert data as summarized alerts on a dashboard 375, according to one embodiment of the present invention. In an embodiment, the dashboard 375 comprises data generated by the diagnostic contextualization component 115 as well as data related to the diagnostic bit set 236 and received by the diagnostic contextualization component 115. The diagnostic contextualization component 115 is configured to generate an alert resolution status comprising data that allows for contextualized alerts 233 that are generated based upon diagnostic bit sets 236 to be displayed as a prioritized list of asset-related details ordered by severity. In an embodiment, the prioritized list is presented as an active alert display 381 comprising a summarized severity ordered contextualized alert list 378 on the dashboard 375. The data used to generate the summarized alert list 378 is comprised of summarized contextualized categories 384 derived from data related to the contextualized alert 233 and organized as the summarized alert list 378 based upon the alert resolution status generated by the diagnostic contextualization component 115. The summarized contextualized categories 384 are comprised of, for example, NAMUR category data, alert tag ID data, alert timestamp data, alert message data, and the like. In an embodiment, a summarized alert 387 comprises a contextualized alert capable of being ordered by severity, and is further comprised of summarized contextualized categories 384.

Additionally or alternatively, data generated by the diagnostic contextualization component 115 as well as data related to the diagnostic bit set 236 and received by the diagnostic contextualization component 115 is used to generate additional displays on the dashboard 375 based upon data related to the contextualized alert 233 and prioritized according to the generated alert resolution status. In an embodiment, an additional display comprises an asset trend priority display 390 generated to provide an alternative representation of asset-related data prioritized according to the generated alert resolution status. An additional display comprises an alert area distribution display 393 rendered based on data generated by diagnostic contextualization component 115 including location details related to the asset 112.

Still referring to FIG. 6, in an embodiment, data generated by the diagnostic contextualization component 115 as well as data related to the diagnostic bit set 236 and received by the diagnostic contextualization component 115 is used to generate an active alert profile display 396. The active alert profile display 396 comprises a summarized alert resolution profile list 399. The data used to generate the summarized profile list 399 is capable of being organized as profile categories 402 and further comprise, for example, work order number data, tag id data, problem description data, and the like. In an embodiment, an active alert resolution profile 405 is comprised of profile categories 402. And in an embodiment, the data used to render the profile categories 402 is generated by the diagnostic contextualization component 115 during alert response generation 136 to provide a result related to actionable output to update the alert resolution profile.

The diagnostic contextualization component 115 is further configured to render data descriptive of the asset parameter that is specific to the alert resolution profile, in order to generate data used for the active alert profile display 396. The diagnostic contextualization component 115 is also configured to complete tasks in accordance with alert profile generation component 198 and alert profile management component 201 to provide an alert resolution profile and to update the alert resolution profile.

Additionally or alternatively, data generated by the diagnostic contextualization component 115 as well as data related to the diagnostic bit set 236 and received by the diagnostic contextualization component 115 is used to generate additional displays on the dashboard 375 based upon data related to the contextualized alert 233, data related to the generated alert resolution status, and data related to the alert resolution profile. In an embodiment, priority distribution display 408 provides an alternative representation of data related to the alert resolution profile.

Figure 7:
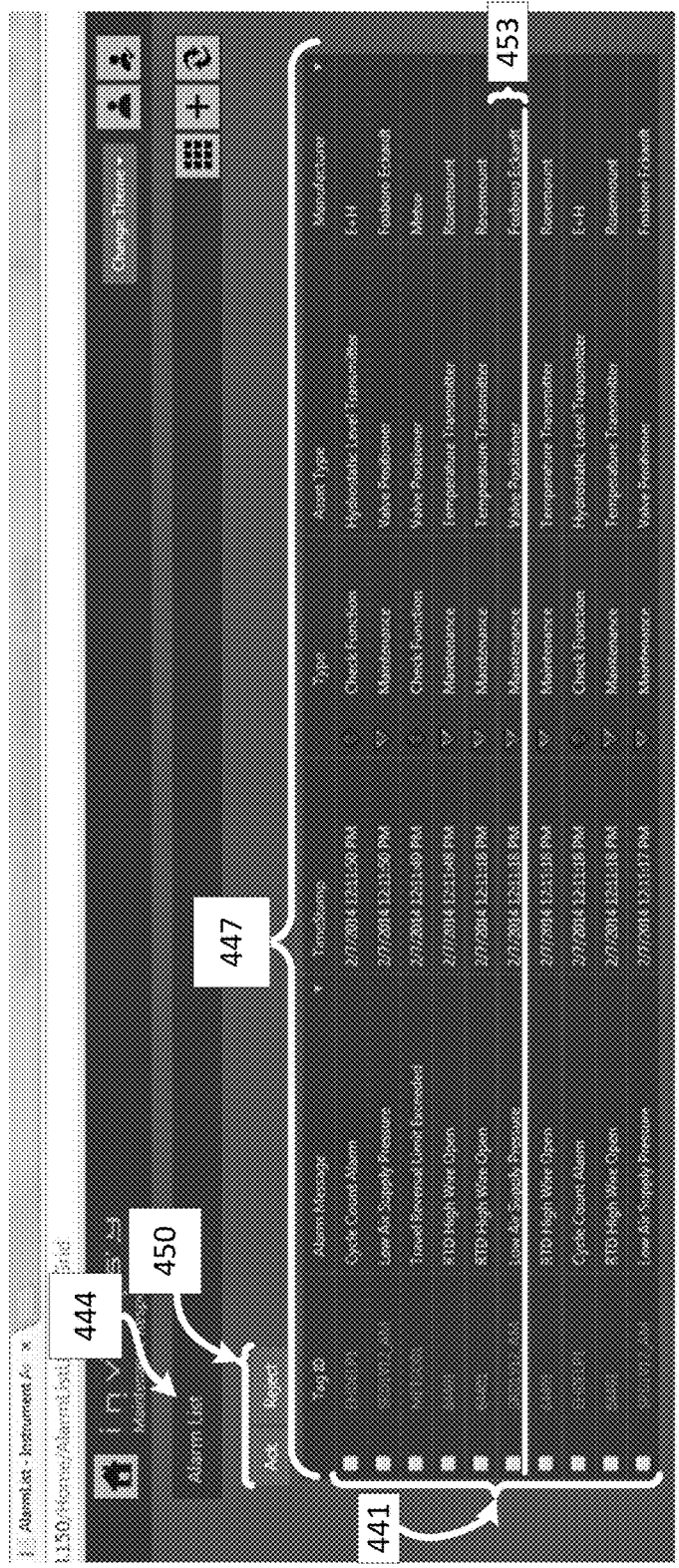
FIG. 7 is an exemplary screen shot of a detailed list of contextualized alerts according to an embodiment of the present invention.

FIG. 7 is an exemplary screen shot depicting a user interface for displaying a list of contextualized alerts according to an embodiment of the present invention. The contextualized alerts 233 are organized as a prioritized alert list 441 of asset-related details ordered by severity. In an embodiment, an alert display 444 is comprised of the alert list 441, and the alert list 441 is comprised of contextualized alerts such as contextualized severity ordered alert 453. The alert list 441 is further comprised of data configured to allow the list to be organized into contextualized categories 447. The contextualized categories 447 comprise, for example, tag id data, alert message data, time stamp data, NAMUR category data, alert type data, asset type data, manufacturer data, and the like. Acknowledgement indications 450 allow for indications to be entered with respect to the alert list 441. In an embodiment, the acknowledgement indications 450 allow for indications to be entered with respect to the acknowledgement or rejection of a contextualized alert 453.

Figure 8:
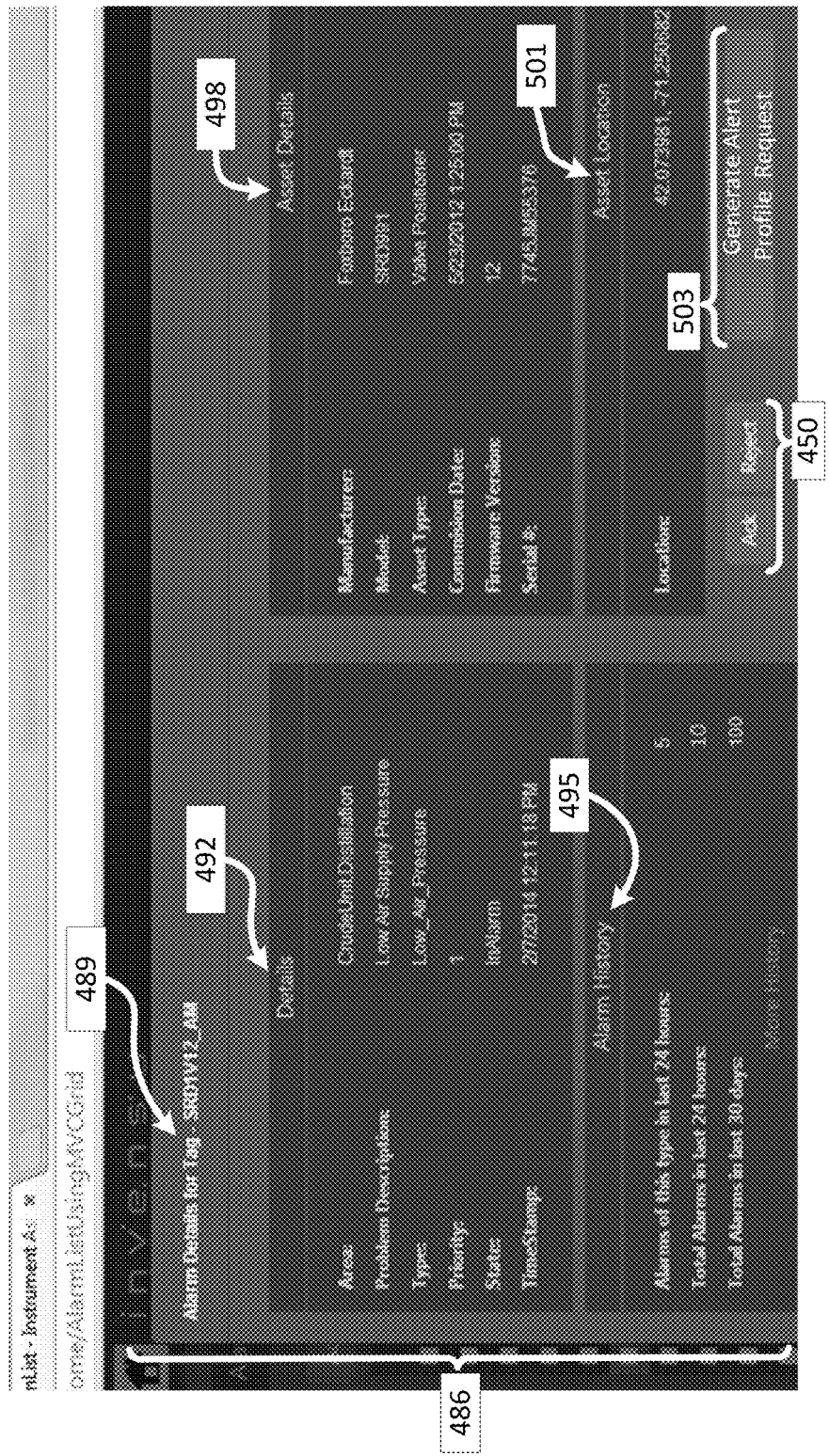
FIG. 8 is an exemplary screen shot of detailed data related to a contextualized alert according to an embodiment of the present invention.

FIG. 8 is an exemplary screen shot of a user interface for displaying detailed alert data related to a contextualized alert according to an embodiment of the present invention. In the illustrated embodiment, data generated by the diagnostic contextualization component 115 as well as data related to the diagnostic bit set 236 and received by the diagnostic contextualization component 115 is used to generate the data used in the contextualized alert detail display 486. The contextualized alert detail display 486 is generated based on data related to a contextualized alert, such as contextualized alert 453 for example. Additionally or alternatively, contextualized alert detail display 486 is generated based on data related to a summarized alert 387. In an embodiment, the contextualized alert detail display 486 is organized according to alert detail data relating to alert identification tag 489 data. In an embodiment, the contextualized detail display 486 comprises alert tag detail display 492, alert history display 495, asset detail display 498, and asset location display 501.

With further reference to FIG. 8, tag alert detail display 492 is comprised of, for example, general area data, problem description data, type data, priority data, state data, time stamp data, and the like. In an embodiment, alert history display 495 is comprised of same type tag alert data within the last 24 hours, any type tag alert data within the last 24 hours, any type tag alert data within the last 30 days, and a "more history" button for receiving input relating to the display of additional alert history. In yet another embodiment, asset details display 498 is comprised of manufacturer data, model data, asset type data, commission date data, firmware version data, and serial number data. In another embodiment, the asset location display 501 is generated based on location data corresponding to latitude and longitude coordinates. Acknowledgement indications 450 are generated for contextualized alert detail display 486, and are configured for allowing indications to be entered with respect to a contextualized alert 453.

Still referring to FIG. 8, the alert detail display 486 further comprises an alert profile request 503 indication configured to automatically generate an alert profile in part based upon the data comprising the contextualized alert details display 486. In an embodiment, upon receiving input related to the alert profile request 503, the diagnostic contextualization component 115 is configured to execute alert profile generation 198 and alert profile management 201 as described herein. Receiving an indication related to alert profile generation 503 results in the creation of an alert resolution profile and receiving an indication related to the alert profile generation indication 503 results in providing a result related to actionable output to an alert resolution profile to update the alert resolution profile.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A computer implemented system configured to generate a contextualized alert related to an alert resolution process in an industrial process control system, the computer implemented system comprising:
   an asset repository storing asset-specific data for a plurality of industrial process assets of the industrial process control system, the asset-specific data comprising alert response data, asset identification data and alert prioritization data;
   a diagnostic contextualization component coupled to the asset repository and configured for generating an alert resolution status of the contextualized alert by performing the steps of:
      receiving an asset parameter descriptive of a condition of a first asset of the plurality of industrial process assets, from an asset monitoring system;
      retrieving the asset identification data for the first asset from the asset repository to interpret the received asset parameter;
      retrieving the alert prioritization data for the first asset from the asset repository based on the retrieved asset identification data;
      determining the condition of the first asset by interpreting the received asset parameter based on the retrieved asset identification data and the retrieved alert prioritization data, wherein the determination distinguishes, based on the retrieved asset identification data and the retrieved alert prioritization data, the condition of the first asset as described by the received asset parameter from a different condition of a second asset of the plurality industrial process assets as described by the asset parameter;
      generating the contextualized alert based on the retrieved asset identification data and the retrieved alert prioritization data, wherein the contextualized alert includes asset-related data, wherein the asset-related data includes one or more of the following: details of the determined condition, a context of the asset monitoring system, documentation data specific to the first asset, and historical information about previous maintenance of the first asset;
      determining whether an actionable output related to the contextualized alert has been received by the diagnostic contextualization component, the actionable output addressing the condition of the first asset while adhering to a general maintenance plan; and
      generating the alert resolution status based on the determination of whether the actionable output has been received to enable a dashboard to display the contextualized alert in a list of alerts ordered by severity based on the retrieved alert prioritization data in a manner that provides information necessary to resolve the condition of the first asset while adhering to the general maintenance plan which is applicable to all of the plurality of industrial process assets.

2. The system of claim 1, further comprising storing the generated alert resolution status in the asset repository, and wherein generating the alert resolution status further comprises comparing the alert response data to the alert resolution status to render the actionable output.

3. The system of claim 2, further comprising an alert response generation component configured to perform the steps of:
providing a result related to the actionable output to an alert resolution profile to update the alert resolution profile; and
determining the alert resolution status based on the alert resolution profile as updated.

4. The system of claim 3, wherein the alert response generation component is further configured to perform the steps of:
providing the alert resolution profile to a resource planning system; and
updating the alert resolution profile based on data received from the resource planning system in response to the provided alert resolution profile.

5. The system of claim 2, wherein the alert response data comprises one or more of the following: other alerts reported by the first asset; installation history for the first asset; location details related to the first asset; and maintenance work planned for the first asset.

6. The system of claim 1, wherein the contextualized alert further comprises data used to generate a list of asset-related details ordered by severity.

7. The system of claim 1, wherein determining whether the actionable output related to the contextualized alert has been received further comprises rendering data descriptive of the asset parameter that is specific to an alert resolution profile.

8. The system of claim 1, wherein the asset parameter comprises at least one of a diagnostic bit set and an alert description.

9. A tangible processor-readable memory storing processor-executable instructions for generating an alert resolution status of a contextualized alert for maintaining an asset monitoring system, wherein the contextualized alert is related to an alert resolution process of an industrial process control system that comprises a plurality of industrial process assets, said instructions comprising:
instructions performed by a diagnostic contextualization component coupled to an asset repository and configured for generating the alert resolution status of the contextualized alert by performing the steps of:
receiving an asset parameter descriptive of a condition of a first asset of the plurality of industrial process assets, from the asset monitoring system;
retrieving asset identification data for the first asset from the asset repository for interpreting the asset parameter;
retrieving alert response data from the asset repository for interpreting the asset parameter;
determining the condition of the first asset by interpreting the asset parameter based on the asset identification data and the alert response data, wherein the determination distinguishes, based on the retrieved asset identification data and the retrieved alert response data, the condition of the first asset as described by the received asset parameter from a different condition of a second asset of the plurality industrial process assets as described by the asset parameter;
retrieving alert prioritization data from the asset repository based on the retrieved asset identification data;
generating the contextualized alert based on the retrieved asset identification data, the retrieved alert response data, and the retrieved alert prioritization data, wherein the contextualized alert includes data related to the first asset and a context of the asset monitoring system;
determining whether an actionable output related to the contextualized alert has been received by the diagnostic contextualized component, the actionable output addressing the condition of the first asset while adhering to a general maintenance plan; and
generating the alert resolution status based on the determination of whether the actionable output has been received to enable a dashboard to display the contextualized alert in a list of alerts ordered by severity based on the retrieved alert prioritization data in a manner that provides information necessary to resolve the condition of the first asset while adhering to the general maintenance plan which is applicable to all of the plurality of industrial assets.

10. The computer readable medium of claim 9, further comprising storing the generated alert resolution status in the asset repository, and wherein generating the alert resolution status further comprises comparing the alert response data to the alert resolution status to render actionable output.

11. The computer readable medium of claim 10, further comprising instructions for an alert response generation component configured to perform the steps of:
providing a result related to the actionable output to an alert resolution profile to update the alert resolution profile; and
determining the alert resolution status based on the updated alert resolution profile.

12. The computer readable medium of claim 11, further comprising instructions for the alert response generation component further configured to perform the steps of:
providing the alert resolution profile to a resource planning system; and
updating the alert resolution profile based on data received from the resource planning system in response to the provided alert resolution profile.

13. The computer readable medium of claim 9, wherein determining whether the actionable output related to the contextualized alert has been received further comprises rendering data descriptive of the asset parameter that is specific to an alert resolution profile.

14. A computerized method for generating an alert resolution status of a contextualized alert related to an alert resolution process in an industrial process control system comprising a plurality of industrial process assets, comprising:
a diagnostic contextualization component coupled to an asset repository and configured for generating the alert resolution status of the contextualized alert by performing the steps of:
retrieving asset identification data from an asset repository for interpreting a received asset parameter associated with a first asset of the plurality of industrial process assets, from an asset monitoring system, wherein the asset parameter is descriptive of a condition of the first asset;
retrieving alert response data from the asset repository for interpreting the asset parameter;
retrieving alert prioritization data from the asset repository based on the retrieved asset identification data;
determining the condition of the first asset by interpreting the received asset parameter based on the retrieved asset identification data and the retrieved alert prioritization data, wherein the determination distinguishes, based on the retrieved asset identification data and the retrieved alert prioritization data, the condition of the first asset as described by the received asset parameter from a different condition of a second asset of the plurality industrial process assets as described by the asset parameter;

generating the contextualized alert based on the retrieved asset identification data, the retrieved alert response data, and the retrieved alert prioritization data, wherein the contextualized alert includes asset-related data, wherein the asset-related data includes one or more of the following: details of the determined condition of the first asset, a context of the asset monitoring system, documentation data specific to the first asset, and historical information about previous maintenance of the first asset;

determining whether an actionable output related to the contextualized alert has been received by the diagnostic contextualization component, the actionable output addressing the condition of the first asset while adhering to a general maintenance plan; and generating the alert resolution status based on the determination of whether the actionable output has been received to enable a dashboard to display the contextualized alert in a list of alerts ordered by severity based on the retrieved alert prioritization data in a manner that provides information necessary to resolve the condition of the first asset while adhering to the general maintenance plan which is applicable to all of the plurality of industrial process assets.

15. The computerized method of claim 14, further comprising storing the generated alert resolution status in the asset repository, and wherein generating the alert resolution status further comprises comparing the alert response data to the alert resolution status to render actionable output.

16. The computerized method of claim 15, wherein the asset parameter comprises a diagnostic bit set and wherein the alert response data comprises one or more of the following: other alerts reported by the first asset; installation history for the first asset; location details related to the first asset; and maintenance work planned for the first asset.

17. The computerized method of claim 14, further comprising:
receiving, by a user interface displaying a transformed actionable output, a selection on the user interface; and
generating an alert response profile to display on the user interface based on the received selection.

18. The computerized method of claim 17, further comprising:
providing the alert resolution profile to a resource planning system; and
updating the alert resolution profile based on data received from the resource planning system in response to the provided alert resolution profile.

19. The computerized method of claim 14, wherein generating the contextualized alert comprises generating a list of asset-related details ordered by severity.

20. The computerized method of claim 14, wherein determining whether the actionable output related to the contextualized alert has been received comprises rendering data descriptive of the asset parameter that is specific to an alert resolution profile.

* * * * *